United States Patent [19]

Kigawa et al.

[11] Patent Number: 5,428,521
[45] Date of Patent: Jun. 27, 1995

[54] NON-CONTACT POWER SUPPLY APPARATUS

[75] Inventors: Michio Kigawa, Tokyo; Shinichi Higuchi, Iwaki, both of Japan

[73] Assignees: Alps Electric Co, Ltd.; Kigawa Electronic Engineering Laboratory, Inc., both of Tokyo, Japan

[21] Appl. No.: 138,860

[22] Filed: Oct. 19, 1993

[30] Foreign Application Priority Data

Oct. 21, 1992 [JP] Japan .................. 4-307706

[51] Int. Cl.$^6$ ........................... H02M 3/338
[52] U.S. Cl. ........................... 363/22; 363/97
[58] Field of Search ............ 363/22, 23, 97, 131; 323/299; 331/112, 113 R, 114

[56] References Cited

U.S. PATENT DOCUMENTS

| | | | |
|---|---|---|---|
| 4,422,032 | 12/1983 | Kakumoto et al. | 320/39 |
| 4,504,874 | 3/1985 | Imai | 360/66 |
| 4,811,187 | 3/1989 | Nakajima et al. | 363/25 |
| 5,225,972 | 7/1993 | Sakamoto | 363/18 |

*Primary Examiner*—Steven L. Stephan
*Assistant Examiner*—Adolf Berhane
*Attorney, Agent, or Firm*—Guy W. Shoup; Patrick T. Bever

[57] ABSTRACT

OBJECT: To provide a non-contact power supply apparatus capable of supplying stable power very efficiently even when changes in load at the receiving side occur by tuning AC frequency supplied to the oscillating circuit on the receiving side and the resonant frequency of the resonance circuit on the receiving side. CONSTITUENTS: At the receiving side is provided a resonance circuit 3 in which resonance coil L3 on the receiving side is connected in parallel with resonance capacitor C3. At the supplying side are provided a detecting coil L2 which detects resonant frequency of resonance circuit 3 on the receiving side and a control means 1 which tunes AC frequency supplied to the aforementioned oscillating circuit 2 on the supplying side with resonant frequency of the aforementioned oscillating circuit 3 on the receiving side according to the frequency of induced electromotive force detected by said detecting coil L2.

7 Claims, 3 Drawing Sheets

NON-CONTACT POWER SUPPLY APPARATUS

BACKGROUND OF THE INVENTION

1. Field of the Invention

The present invention relates to a non-contact power supply apparatus which supplies power to electronic equipment containing a charging battery by electromagnetic induction without contact.

2. Description of the Related Arts

Hitherto, methods for supplying power by electromagnetic induction were disclosed, for example, in Japanese Non-examined Patent Publication No. 3-98432. The structure of the apparatus used in this method is as shown in FIG. 5.

That is, this apparatus has separately provided on its supply side a supplying oscillating circuit 6 in which a supplying oscillating coil L6 is connected to an oscillator B3, and a supplying resonance circuit 7 in which a resonance capacitor C6 is connected in parallel with a resonance coil L7.

In addition, this apparatus has on its receiving side a receiving resonance circuit 8, in which a receiving resonance capacitor C7 is connected to a receiving resonance coil L8, and a rectifier smoothing circuit 9 containing a bridge D3 and a capacitor C8.

Further, the disclosed apparatus is capable of transmitting power efficiently by causing supplying oscillating circuit 6 to oscillate at a predetermined frequency approaching the resonant frequency of supplying resonance circuit 7 and receiving resonance circuit 8, so that it virtually resonates at the frequency of supplying oscillating circuit 6, supplying resonance circuit 7, and receiving resonance circuit 8.

However, in the above-described type of apparatus the resonant frequency of supplying resonance circuit 7 and receiving resonance circuit 8 is independently determined. The oscillating frequency of supplying oscillating circuit is also fixed independently.

For this reason, a change in load at the receiving side changes the resonant frequency of the resonance circuit 8 at the receiving side, preventing tuning of oscillating circuit 6 and resonance circuit 7 on the supply side with resonance circuit 8 on the receiving side. Consequently, the amount of power which can be supplied is greatly reduced, and sufficient power cannot be stably supplied.

SUMMARY OF THE INVENTION

Accordingly, an object of the present invention is to provide a non-contact power supply apparatus capable of tuning the oscillating frequency of the oscillating circuit on the supply side and the resonance frequency of the resonance circuit on the receiving side so that stable power can be supplied very efficiently.

A power supply apparatus which supplies power in the oscillating circuit on the supplying side from the supplying coil to the receiving coil opposite the supplying coil by electromagnetic induction without contact comprising a resonance capacitor connected in parallel with the aforementioned coil on the receiving side, a detecting coil which detects resonant frequency at the receiving side, and a control means which tunes the AC power frequency to be supplied to the aforementioned supplying coil to the resonance frequency of the aforementioned coil on the receiving side in accordance with the frequency of the electromotive force detected by the detecting coil.

The detecting coil of the control means detects the resonance frequency of the coil on the receiving side as induced electromotive force generated by electromagnetic induction, and controls the AC power frequency supplied to the coil on the receiving side in accordance with the frequency of the induced electromotive force so that it equals the resonant frequency of the coil on the receiving side.

Accordingly, each time a change in load on the receiving side changes the resonant frequency of the resonance circuit on the receiving side, the AC frequency supplied to the receiving side can be tuned in accordance with changes in resonant frequency.

DESCRIPTION OF THE PREFERRED EMBODIMENTS

One embodiment of the present is hereunder described in accordance with the drawings.

Figure 1:
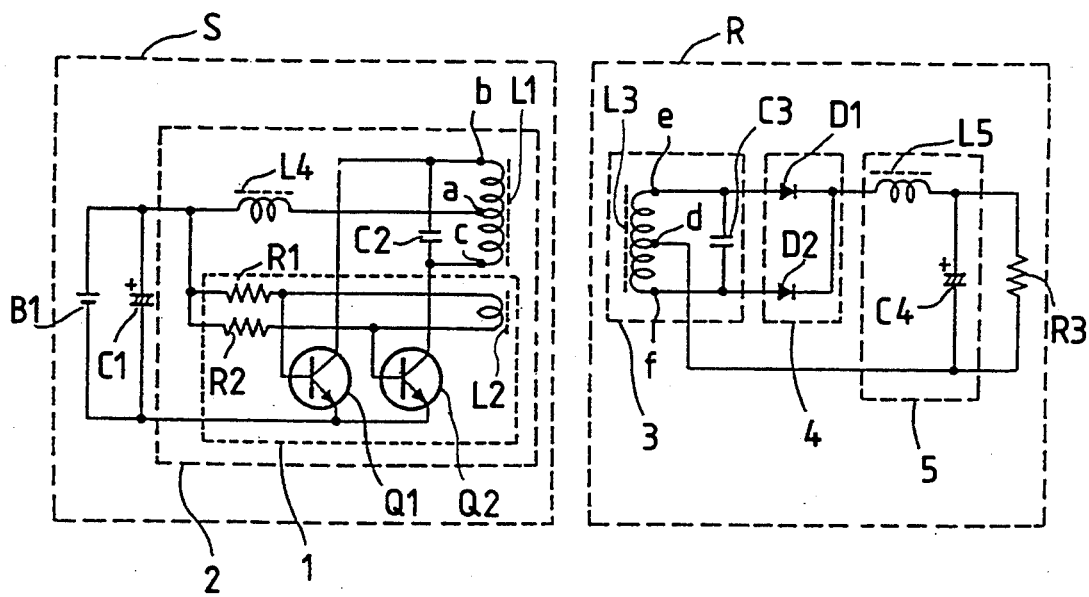
FIG. 1 is a circuit diagram of the non-contact power supply apparatus of the present embodiment.
Figure 2:
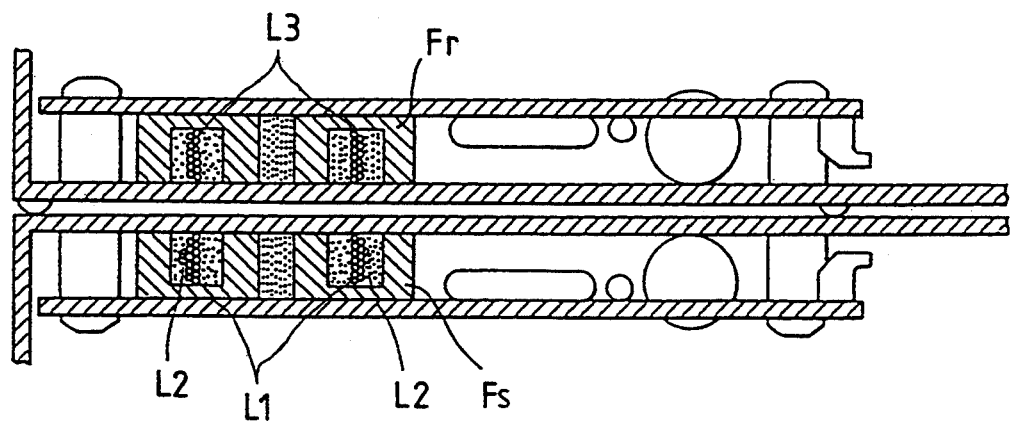
FIG. 2 is a cross section of an essential portion of the embodiment in which the non-contact power supply apparatus of FIG. 1 installed in equipment.
Figure 3:
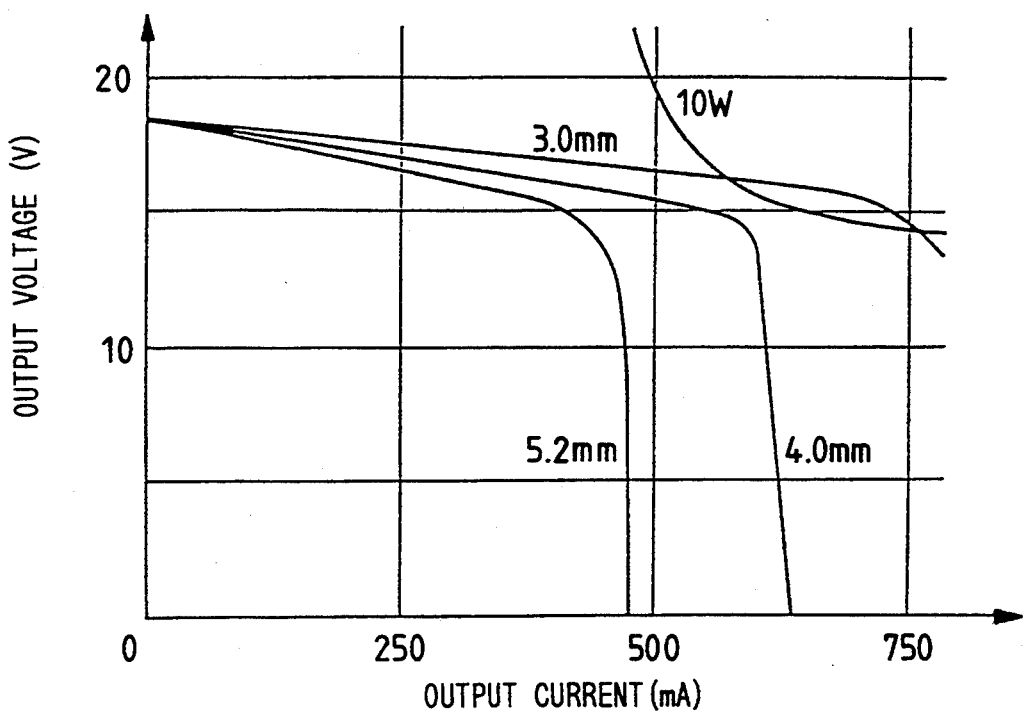
FIG. 3 is a graph showing the relationship between output voltage and input voltage of the non-contact power supply apparatus of FIG. 1.
Figure 4:
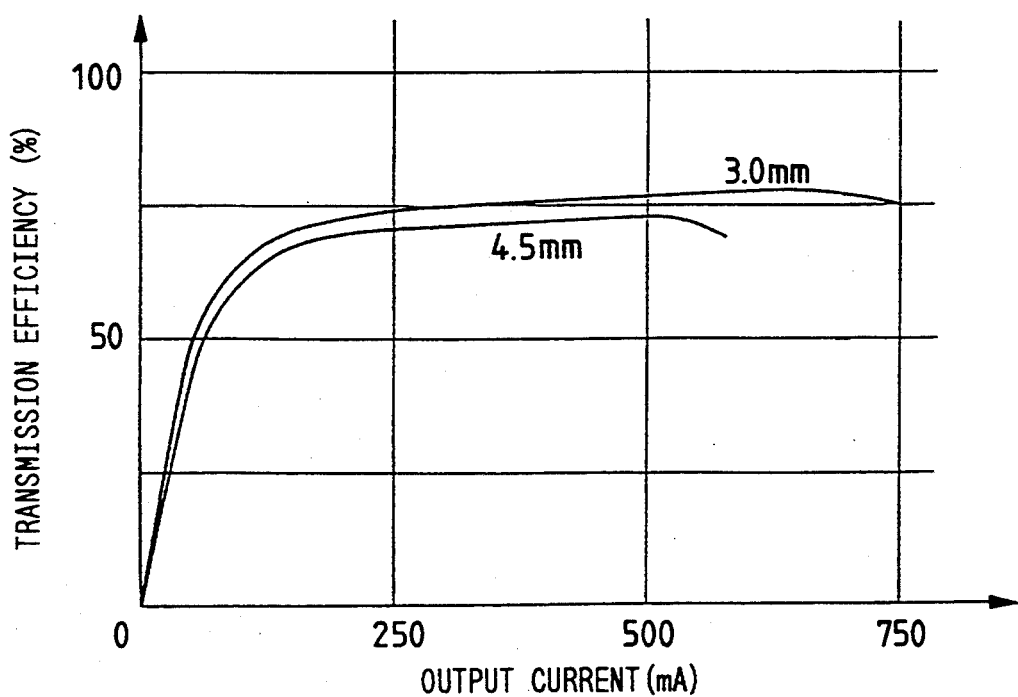
FIG. 4 is a graph showing the relationship between output current and power transmission efficiency of the non-contact power supply apparatus of FIG. 1.
Figure 5:
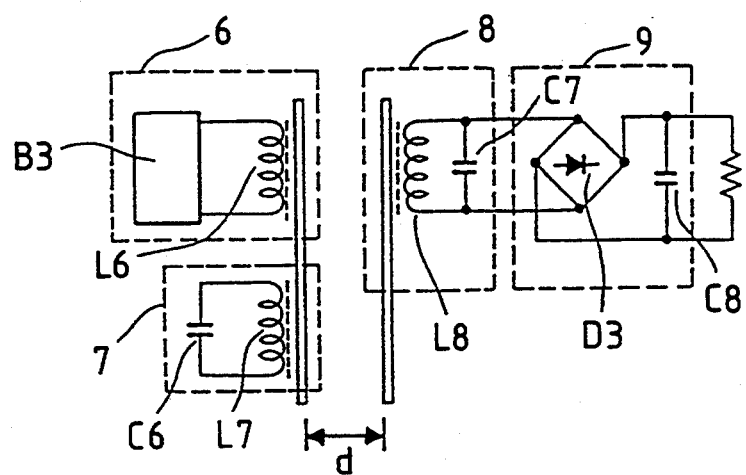
FIG. 5 is a circuit diagram of a conventional non-contact power supply apparatus.

FIG. 1 is a circuit diagram of the embodiment;

FIG. 2 is a cross section of an essential portion of the embodiment in which the apparatus is installed in equipment;

FIG. 3 is a graph showing the relationship between output voltage and output current at the receiving side as measured while changing distance, d, between supplying oscillating coil L1 and receiving resonance coil L3 of the embodiment of FIG. 1; and FIG. 4 is a graph showing the relationship between output current and power transmission efficiency at the receiving side as measured while changing distance, d, between supplying oscillating coil L1 and receiving resonance coil L3 of the embodiment of FIG. 1.

First, the configuration of the non-contact power supply apparatus of the present embodiment is described in accordance with FIG. 1.

The present embodiment comprises a supplying section S and a receiving section R. In the circuit configuration illustrated in FIG. 1, the circuit on the left is the supplying section S and that on the right is the receiving section R.

Supplying section S comprises a power supply B1 and a supplying oscillating circuit 2 which includes frequency control circuit 1. Receiving section R comprises a receiving resonance circuit 3, a rectifier circuit 4, and a smoothing circuit 5.

The positive electrode of power supply B1 is connected to neutral point 'a' of an oscillating coil L1 of the aforementioned oscillating circuit 2 at the supplying side by means of a coil L4, through which power is supplied from power supply B1. Upper end point b and lower end point c as seen in FIG. 1 of the aforementioned oscillating coil L1 are connected to frequency control circuit 1 by means of a capacitor C2.

The aforementioned frequency control circuit comprises a detecting coil L2, a transistor Q1, a transistor Q2, a resistor R1, and a resistor R2. In transistor Q1 and transistor Q2, each collector is connected respectively to the upper end b and lower end c as viewed in FIG. 1 of oscillating coil 1, each emitter is connected to the negative electrode of power supply B, and each base, which is connected to its respective end points of detecting coil L2, is connected to the positive electrode of power supply B1 by means of resistor R1 and R2 respectively.

Receiving section R comprises a receiving resonance circuit 3, rectifier circuit 4, and smoothing circuit 5.

The aforementioned receiving resonance circuit 3 has a resonance capacitor C3 connected in parallel with receiving resonance coil L3. The aforementioned rectifier circuit 4 and smoothing circuit 5 are arranged by what is commonly called the choke-input rectifier method in which the rectifier circuit 4 has a diode D1 and diode D2 connected between the upper end point e and lower end point f of the receiving resonance coil 3 as seen in FIG. 1 and choke coil L5; and the smoothing circuit 5 has choke coil 5 connected between diode D1, diode D3, and load resistor R3 (which represents a battery charged by the apparatus) with smoothing capacitor C4 connected in parallel with load resistor R3.

FIG. 2 is a cross section of an essential portion of the apparatus containing this circuit. Supplying core Fs and Receiving core Fr are positioned opposite each other, with the supplying oscillating coil L1 and detecting coil L2 wound around the supplying core Fs, and the receiving resonance coil L3 wound around the receiving core Fr.

The operation of the circuit having the aforementioned structure is hereunder described.

First, the operation of the circuit of the oscillating circuit 2 of the supplying section S of FIG. 1 is described.

The power supply B1 voltage is applied to the bases of transistors Q1 and transistors Q1 through resistor R1 or resistor R2, causing current flow between the emitter and the collector of transistor Q1 which has a higher hFe value than transistor Q2. When current flows between the emitter and collector, current flows from the neutral point toward the upper end point b of the supplying oscillating coil L1 as seen in FIG. 1 and magnetic flux is generated in that direction. When magnetic flux is generated at the supplying oscillating coil L1, an electromotive force opposite in direction to that of the magnetic flux is induced in the detecting coil L2. The induced electromotive force causes the potential of the transistor Q1 base to drop to a lower level, and that of the transistor Q2 base to increase to a higher level, preventing current from flowing between the emitter and collector of transistor Q1 and allowing current to flow between the emitter and collector of transistor Q2. This time, current flows in the opposite direction from the neutral point 'a' toward the lower end point c of supplying oscillating coil L1 as seen in FIG. 1, producing magnetic flux travelling in the same direction. The magnetic flux induces an electromotive force opposite to the above direction in detecting coil 2, which switches off transistor Q2 and switches on Q1.

In this way, oscillation is produced by magnetic flux around supplying oscillating coil L1 which induces an electromotive force in detecting coil L2 alternately switching transistor Q1 and transistor Q2 on and off.

Next, the operation of resonance circuit 3 on the receiving side is hereunder described.

When magnetic flux of oscillating coil L1 on the supplying side induces electromotive force in the resonance coil L3 on the receiving side, electric charge accumulates on the electrodes of resonance capacitor C3. With no more electromotive force in the aforementioned direction, the accumulated charge on the resonance capacitor starts to shift toward the resonance coil on the receiving side, so that a discharge occurs at the resonance capacitor C3. The discharge generates a counterelectromotive force in conformity with Lenz's law. After all the charge has shifted from the resonance capacitor to the resonance coil L3 on the receiving side, it starts to flow in the reverse direction back toward the resonance capacitor. The resonance capacitor C3 is here recharged. After resonance capacitor C3 is recharged, resonance coil L3 on the receiving side discharges electricity as before toward resonance coil L3 on the receiving side. This recharging and discharging operation is repeated over and over again.

The operations of rectifier circuit 4 and smoothing circuit 5 are as follows.

The two diodes D1 and D2 comprising the rectifier circuit 4 operate as described below.

When an electromotive force is induced in resonance coil L3 on the receiving side from the lower end point f toward the upper end point e as seen in FIG. 1, the diode D1 extracts the electromotive force generated from the neutral point d to the upper end point e of the resonance coil L3 on the receiving side. When an electromotive force is induced in the resonance coil L3 on the receiving side from the upper end point e toward the lower end point f as seen in FIG. 1, the diode D2 extracts the electromotive force generated in the resonance coil L3 on the receiving side from the neutral point d to the lower end point f.

Pulsating current rectified by the two diodes D1 and D2 flows through choke coil L5, is made smooth by self-induction of choke coil L5 and smoothing capacitor C4, and supplied to a load, such as a battery which is charged by the rectified current.

Finally, the operation of the aforementioned frequency control circuit 1 is described.

In detecting coil L2, which is affected by magnetic flux produced by both oscillating coil L1 on the supplying side and the resonance coil L3 on the receiving side, electromotive force is induced. When ambient conditions such as ambient vibrations change the distance between the oscillating coil L1 on the supplying side and coil L3 on the receiving side, a difference in oscillating frequencies occurs between that of oscillating coil L1 on the supplying side and that of resonance coil L3 on the receiving side. This induces an electromotive force in the detecting coil L2 having a frequency between that of the aforementioned oscillating coil L1 on the supplying side and that of oscillating coil L3 on the receiving side. Then, an induced electromotive force having a frequency closer to the oscillating frequency on the receiving side than that on the aforementioned supplying side acts on the bases of transistors Q1 and Q2 and turns transistors Q1 and Q2 on and off, so that the oscillating frequency of the oscillating circuit 2 on the supplying side gradually approach and eventually equal the oscillating frequency of the aforementioned resonance circuit 3 on the receiving side.

Consequently, even when ambient conditions such as ambient vibrations change the distance between the oscillating coil L1 on the supplying side and the resonance coil L3 on the receiving side and change the resonant frequency of the resonance circuit 3 on the receiving side sufficient power can be stably supplied by eliminating changes in frequency of the oscillating circuit 2 on the supplying side and that of the resonance circuit 3 on the receiving side.

The following measured results were obtained from the above operations.

FIG. 3 shows a voltage-current relationship of load resistor R3 on the receiving side which holds when a constant voltage supply of 15 V is connected to power supply B1 and the distance, d, between the oscillating coil L1 on the supplying side and the resonance coil L3 on the receiving side is 3 mm, 4 mm, and 5.2 mm. The results reveal that an output power exceeding 10 W can be obtained if we look at, for example, the aforementioned 3-mm L1-to-L3 distance curve.

FIG. 3 reveals that at an output voltage of not more than approximately 14 V the output current is virtually constant, if we look, for example, at the aforementioned 4-mm L1-to-L3 distance curve. The current becomes constant because as the load resistor R3 resistance decreases the charge accumulated on resonance capacitor C3 of resonance circuit 3 on the receiving side flows through load resistor 3 without flowing through resonance coil L3 on the receiving side, so that resonance no longer occurs at resonance circuit 3 on the receiving side, reducing the amount of transmissible power.

As a result, excess current in the load can be prevented when a short circuit and other circuit problems occur. The apparatus, which does not require a constant current circuit for charging, operates most advantageously when it is used with devices in which a charging battery is connected to a load on the receiving side.

FIG. 4 shows power transmission efficiency, that is the ratio between the power at the supplying side and that of load R3 on the receiving side, which holds when a 15 V constant voltage supply is connected to power supply B1, and the distance, d, between the oscillating coil L1 on the supplying side and resonance coil L3 on the receiving side is 3 mm and 4.5 mm. It can be seen from this Figure that the transmission efficiency of the non-contact power supply apparatus of the present embodiment is nearly 80%.

As described in detail above, the non-contact power supply apparatus of the present invention can supply sufficient power very efficiently using a simple circuit configuration even when distance between the supplying coil and the receiving coil changes by tuning each time such a change occurs. In addition, the apparatus can be used as a non-contact constant current supply apparatus and be installed in numerous types of equipment such as equipment containing a charging battery.

What is claimed is:

1. A non-contact power supply apparatus for supplying power to a load, the apparatus comprising:
    a power source having a positive electrode and a negative electrode;
    a supplying oscillating circuit including a first coil and a second coil connected in series, the positive electrode of the power source being connected between the first coil and the second coil;
    a receiving resonance coil electromagnetically coupled to the supplying oscillating circuit, the receiving resonance coil being connected to the load; and
    a frequency control circuit including a detecting coil electromagnetically coupled to the receiving resonance coil, and a switching circuit connected to the detecting coil for switching current direction in the first coil and the second coil in response to a voltage across the detecting coil;
    wherein the voltage across the detecting coil changes in response to a magnetic flux produced by the receiving resonance coil.

2. A non-contact power supply apparatus according to claim 1, wherein the switching circuit comprises:
    a first transistor having a base connected to a first end of the detecting coil, a collector connected to the first coil, and an emitter connected to the negative electrode of the power source; and
    a second transistor having a base connected to a second end of the detecting coil, a collector connected to the second coil, and an emitter connected to the negative electrode of the power source.

3. A non-contact power supply apparatus according to claim 1, wherein the apparatus further comprises:
    a rectifying circuit connected to the receiving resonance coil; and
    a smoothing circuit connected to the rectifying circuit for smoothing a rectified current output by the rectifying circuit, the smoothing circuit including a coil and a capacitor connected in series with the coil and in parallel with the load.

4. A non-contact power supply apparatus according to claim 1, wherein the receiving resonance coil is comprised of a resonance capacitor connected in parallel with the resonance coil.

5. A non-contact power supply apparatus for supplying power to a battery, the apparatus comprising:
    a DC power source;
    a supplying oscillating coil connected to the DC power source, the supplying oscillating coil generating a first magnetic flux in response to electrical currents flowing in first and second directions;
    a receiving resonance coil electromagnetically coupled to the supplying oscillating coil and being connected to the load, the receiving resonance coil producing an induction electromotive force in response to a variation in the magnetic flux of the supplying oscillating coil;
    a detecting coil electromagnetically coupled to the receiving resonance coil, a voltage across the detecting coil being altered by a second magnetic flux generated by the receiving resonance coil; and
    a switching circuit connected to the supplying oscillating coil and to the detecting coil for controlling current direction through the supplying oscillating coil in response to the voltage across the detecting coil;
    wherein the induction electromotive force produced by the receiving resonance coil is rectified, smoothed and applied to the battery.

6. A non-contact power supply apparatus according to claim 5, wherein the switching circuit comprises:
    a first transistor having a base connected to a first end of the detecting coil, a collector connected to a first end of the supplying oscillating coil, and an emitter connected to a negative electrode of the DC power source; and
    a second transistor having a base connected to a second end of the detecting coil, a collector connected to a second end of the supplying oscillating coil, and an emitter connected to a negative electrode of the power source.

7. A non-contact power supply apparatus according to claim 5, wherein a spacing distance between the supplying oscillating coil and the receiving resonance coil is 5 mm or less.

* * * * *